(12) United States Patent
Char

(10) Patent No.: US 11,968,292 B1
(45) Date of Patent: Apr. 23, 2024

(54) INCREMENTAL AUTHENTICATED DATA ENCODINGS

(71) Applicant: Amazon Technologies, Inc., Seattle, WA (US)

(72) Inventor: Hanson Char, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/576,142

(22) Filed: Dec. 18, 2014

(51) Int. Cl.
*H04L 9/08* (2006.01)

(52) U.S. Cl.
CPC ........ *H04L 9/0819* (2013.01); *H04L 2209/24* (2013.01)

(58) Field of Classification Search
CPC ............................ H04L 9/0819; H04L 2209/24
See application file for complete search history.

(56) References Cited

U.S. PATENT DOCUMENTS

| | | | | |
|---|---|---|---|---|
| 6,065,008 A * | 5/2000 | Simon | ................... | G06F 17/214 |
| 6,959,384 B1 * | 10/2005 | Serret-Avila | ............ | G06F 21/64 713/161 |
| 8,832,466 B1 * | 9/2014 | McGregor, Jr. | ....... | H04L 9/0836 380/37 |
| 2003/0126400 A1 * | 7/2003 | Debiez | ................... | G06F 21/64 711/216 |
| 2006/0136728 A1 * | 6/2006 | Gentry | .................. | H04L 9/3247 713/176 |
| 2007/0255947 A1 * | 11/2007 | Choudhury | ........... | H04L 9/0637 713/161 |
| 2011/0255689 A1 * | 10/2011 | Bolotov | ................ | H04L 9/0631 380/42 |
| 2013/0064370 A1 * | 3/2013 | Gouge | ................ | H04L 63/0428 380/255 |
| 2013/0111196 A1 * | 5/2013 | Pasam | ................... | G06F 21/575 713/1 |

OTHER PUBLICATIONS

Dworkin, Morris, "Recommendation for Block Cipher Modes of Operation: Galois/Counter Mode (GCM) and GMAC", NIST Special Publication 800-38D, Nov. 2007, 39 pages.*

Golle et al. "Authenticating Streamed Data in the Presence of Random Packet Loss", 2001, 10 pages, obtained from https://crypto.stanford.edu/~pgolle/papers/auth.pdf (Year: 2001).*

Bellare, M. et al., "Incremental Cryptography: The Case of Hashing and Signing," Annual International Cryptology Conference, Aug. 21, 1994, Germany, Lecture Notes in Computer Science 839:216-233.

(Continued)

*Primary Examiner* — Jeffrey D. Popham
(74) *Attorney, Agent, or Firm* — Davis Wright Tremaine LLP

(57) ABSTRACT

Data is encoded to be incrementally authenticable. A plaintext is used to generate a ciphertext that comprises a plurality of authentication tags. Proper subsets of the authentication tags are usable to authenticate respective portions of plaintexts obtained from the ciphertext. Portions of the plaintext can be obtained and authenticated without decrypting the complete ciphertext.

2 Claims, 7 Drawing Sheets

(56) References Cited

OTHER PUBLICATIONS

Dworkin, M., "Recommendation for Block Cipher Modes of Operation: Galois/Counter Mode (GCM) and GMAC," NIST Special Publication 800-38D, National Institute of Standards and Technology, Nov. 2007, 39 pages.
McGrew, D.A., and J. Viega, "The Galois/Counter Mode of Operation (GCM)," May 31, 2005, 44 pages.
"Specification for the Advanced Encryption Standard (AES)," Federal Information Processing Standards Publication 197, National Institute of Standards and Technology, Nov. 26, 2001, 51 pages.
Viega, J., and D. McGrew, "The Use of Galois/Counter Mode (GCM) in Ipsec Encapsulating Security Payload (ESP)," Request for Comments: 4106, Standards Track, Jun. 2005, 11 pages.
McGrew, D., and J. Viega, "The Use of Galois Message Authentication Code (GMAC) in Ipsec ESP and AH," Request for Comments: 4543, Standards Track, May 2006, 14 pages.
Salowey, J., et al., "AES Galois Counter Mode (GCM) Cipher Suites for TLS," Request for Comments: 5288, Standards Track, Aug. 2008, 9 pages.
Kanno, S., and M. Kanda, "Addition of the Camellia Cipher Suites to Transport Layer Security (TLS)," Request for Comments: 6367, Informational, Sep. 2011, 9 pages.

\* cited by examiner

INCREMENTAL AUTHENTICATED DATA ENCODINGS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Authenticated encryption is one technique for protecting data from unauthorized access. With authenticated encryption, not only is data protected from the point of confidentiality, but also with respect to integrity and authenticity. While authenticated encryption is suitable for many contexts, conventional uses of authenticated encryption result in various inefficiencies. For example, in conventional implementations of authenticated encryption schemes, the amount of processing that needs to be performed to authenticate plaintext when decrypting can make impractical certain uses of authenticated encryption, such as data streaming and partial retrieval.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include techniques for implementing incremental authenticated encryption. In an embodiment, a plaintext is used to generate a ciphertext that is structured to enable incremental authentication. As part of a process for generating the ciphertext, authentication tags are positioned in the ciphertext such that a portion of ciphertext between two consecutive authentication tags can be authenticated and decrypted without the need to decrypt and authenticate the entire ciphertext. As a result of this property, data between any two authentication tags can be authenticated and decrypted without the need to decrypt and authenticate the entire ciphertext.

In an embodiment, each authentication tag is a secured incremental message authentication code generated to ensure the strength of the cipher and mode of operation being used. For instance, in some examples, each authenticated tag is generated using the same function and the same key, but using a different initial counter block (ICB) so that no nonce ever gets used more than once under the same key. Each authentication tag may be considered as the ciphertext output of an accumulated hash function.

As a result of such techniques, various efficiencies can be introduced into systems utilizing encryption for data. For instance, a data object (e.g., a video file) can be encrypted at rest (i.e., while persistently stored), but streamed without having to decrypt the entire data object to verify authenticity prior to initiation of the stream. Similarly, a portion of a very large data object can be retrieved, authenticated, and decrypted without having to access the whole data object and decrypting the whole data object. Such efficiencies result in various improvements to such systems, such as improved latency, lower processing capacity usage, lower bandwidth usage, and other advantages.

Figure 1:
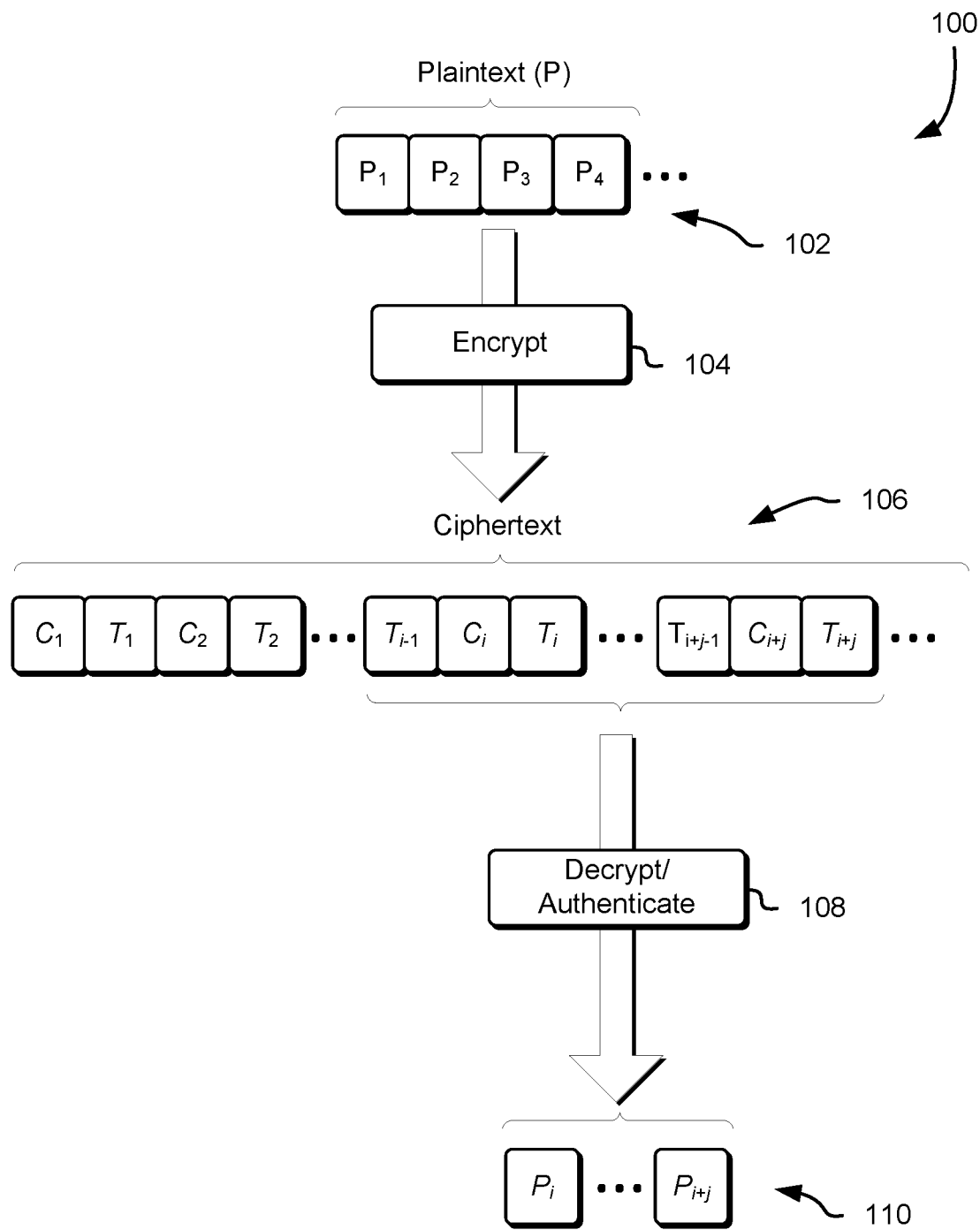
FIG. 1 shows a diagram illustrating various embodiments of the present disclosure.

FIG. 1 shows a diagram 100 illustrating various aspects of the present disclosure. In the diagram 100, plaintext 102 is obtained for encryption. The plaintext 102 may, for example, be data that is to be persistently stored in encrypted form for the purpose of maintaining confidentiality of the data while at rest. Encryption of the plaintext 102 may be performed for other reasons as well, such as transmission over an untrusted network. In this example, the plaintext comprises a plurality of chunks, which may also be referred to as blocks, labeled as $P_1$, $P_2$, etc. Note that the plaintext may not be organized to explicitly identify the chunks (i.e., may not include delimiters that indicate separation of the chunks), but the blocks may simply be sequential subsequences of bits that form the plaintext.

As illustrated in FIG. 1, embodiments of the present disclosure involve encryption 104 of the plaintext P for various reasons, such as confidentiality during persistent storage and/or transmission over a network. In an embodiment, encryption 104 of the plaintext 102 results in a ciphertext 106 that is configured to provide numerous technical advantages. For example, techniques of the present disclosure provide for incremental authenticated encryption that results in various efficiencies, such as the ability to retrieve ranges of ciphertext, authenticate the ranges of ciphertext, and decrypt the ranges of ciphertext without requiring access to the entire plaintext, thereby increasing efficiencies in bandwidth, latency, processing resources, and the like.

In this example, encryption 104 results in the ciphertext 106 comprising chunks of ciphertext (labeled as $C_1$, $C_2$, etc.) with corresponding authentication tags (labeled as $T_1$, $T_2$, etc.). In an embodiment, each ciphertext chunk and authentication tag is a subsequence of bits that form the ciphertext and, in some examples, the subsequences of bits forming the ciphertext chunks and authentication tags are disjoint (do not overlap). Each ciphertext chunk has a corresponding plaintext chunk where the correspondence is determinable by the position of the plaintext chunk in the plaintext (if starting with the plaintext) or by the position of the ciphertext chunk in the ciphertext (if starting with the ciphertext). The chunks and authentication tags, in an embodiment, are computed such that a ciphertext chunk can be authenticated and decrypted using immediately surrounding authentication tags as if the entire data up to and including the ciphertext chunk is used for the authentication. In a broader sense, every ciphertext chunk can be decrypted and authenticated using a proper subset (i.e., a subset of a set that is not equal to the set or, said another way, a subset of a set that excludes at least one member of the set) of the bits that form the ciphertext 106. In a specific example, the ciphertext chunks and authentication tags are arranged such that each authentication tag is sufficient to authenticate all ciphertext chunks from the beginning of the ciphertext to the authentication tag.

In FIG. 1, each ciphertext chunk (except the first) is situated in the ciphertext between two sequential authentication tags. These two tags may be used for authenticated decryption of the ciphertext chunk. Note, however, that different arrangements of data in the ciphertext are considered as being within the scope of the present disclosure. For example, the ciphertext chunks may be sequentially located next to one another as the most significant bits of the ciphertext and the authentication tags may be located together as the least significant bits of the ciphertext and the techniques described herein may be adapted such that, for a ciphertext chunk, the corresponding authentication tags are locatable and useable to perform an authenticated decryption of the ciphertext chunk. Generally, the ciphertext chunks and authentication tags may be arranged in any order and the techniques described herein may be adapted so that the correspondence between ciphertext chunks and authentication tags is determinable to authenticate and decrypt the ciphertext chunks.

As noted, various embodiments of the present disclosure allow for various efficiencies, such as efficient retrieval of data and, generally, efficient partial decryption of data with authentication assurances. Accordingly, the illustrative diagram 100 of FIG. 1 shows an authenticated decryption operation 108 that results in a partial plaintext 110 comprising a subset of the plaintext chunks (which may be a proper subset). The decryption 108 may be performed, for example, in response to a request to retrieve a range of a sequence of bits that comprises the plaintext. As a specific example, the techniques of the present disclosure can be used to retrieve a portion of a video file that is stored in encrypted form. As a result of various techniques described herein, not only is a portion of the plaintext determined from the ciphertext 106, but chunks of ciphertext that result in the portion of the plaintext are authenticated without having to access and authenticate other chunks that do not encode any of the portion of the plaintext. In other words, a portion of a ciphertext corresponding to a portion of a plaintext can be authenticated without the complete ciphertext. Such authentication can be performed (when only a portion of the ciphertext is being decrypted) without using the complete ciphertext.

The partial plaintext 110 that is calculated can be provided or used to provide information that was requested. For instance, a range of plaintext requested may not correspond exactly to the boundaries of the first and last chunks of the partial plaintext (labeled as $P_i$ and $P_{i+j}$) and, as a result, a set of most significant bits may be discarded from $P_i$ and a set of least significant bits may be discarded from $P_{i+j}$ to obtain a partial plaintext that matches a requested range of bits of the plaintext 102.

Figure 2:
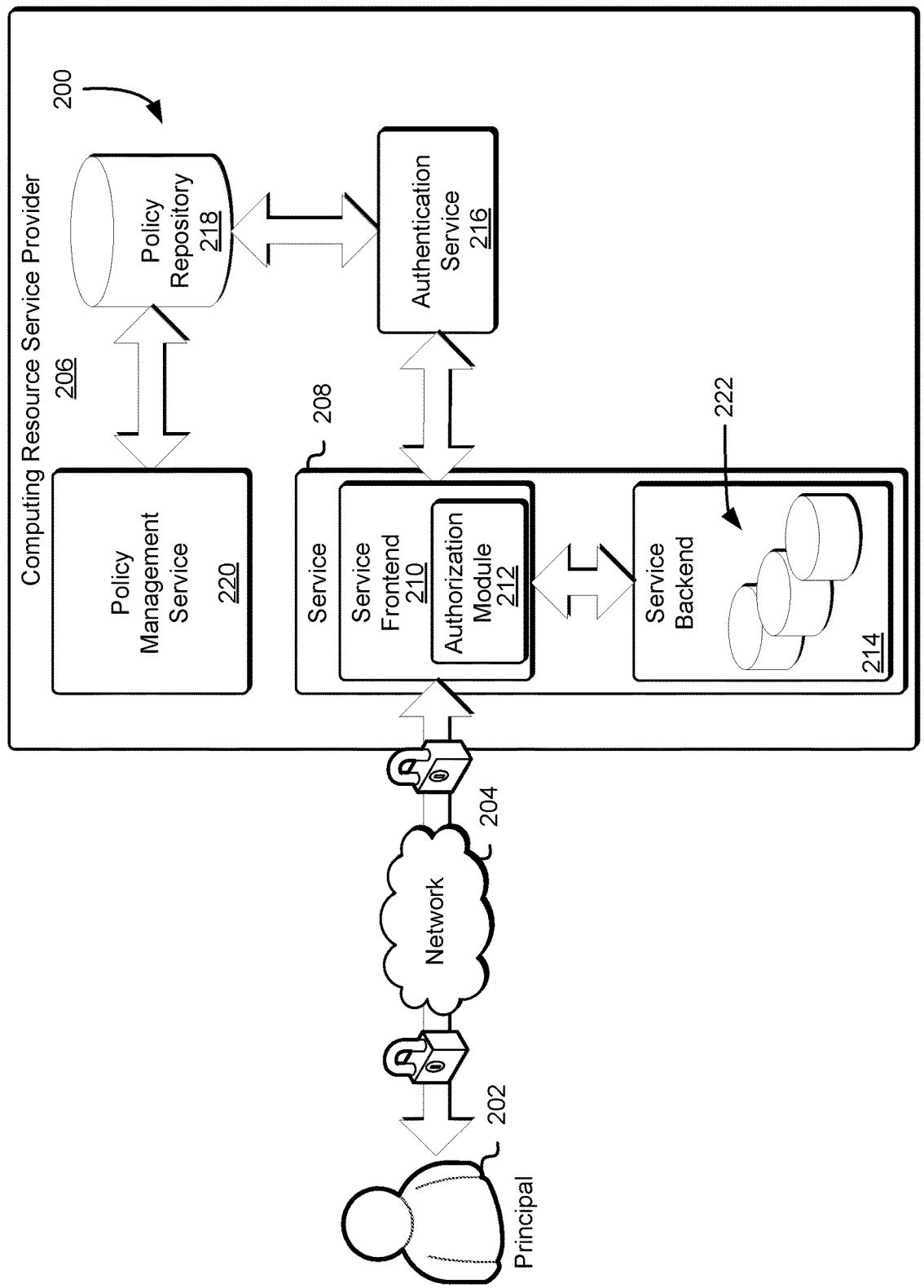
FIG. 2 shows an illustrative example of an environment in which various embodiments can be implemented.

FIG. 2 is an illustrative example of an environment 200 in which various embodiments of the present disclosure can be practiced. In an embodiment, a principal 202 may use a computing device to communicate over a network 204 with a computing resource service provider 206. Communications between the computing resource service provider 206 and the principal 202 may, for instance, be for the purpose of accessing a service 208 operated by the service provider 206, which may be one of many services operated by the service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Generally, a principal is an entity corresponding to an identity managed by the computing resource service provider, where the computing resource service provider manages permissions for the identity. Note, however, that embodiments of the present disclosure extend to identities not managed by the computing resource service provider, such as when identities are anonymous or otherwise unspecified. For example, a policy may apply to anonymous principals.

The principal 202 may correspond to an identity managed by the computing resource service provider 206, such as by the policy management service or another service. The identity may be one of multiple identities managed for an account of a customer of the computing resource service provider, and the computing resource service provider may manage accounts for multiple customers. Note that, while the principal 202 may correspond to a human, such a human may communicate with the computing resource service provider 206 through a suitably configured computing device which may perform operations (e.g., generation and transmission of requests) on behalf of the principal 202. The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the service 208 which, in some examples, is a web service application programming interface request (also referred to simply as a web service request), may be received by a service frontend 210. The service frontend 210 may be a system comprising a set of web servers (e.g., a single web server or a set of web servers which may be managed by a load balancer). Web servers of the frontend 210 may be configured to receive such requests and to process them according to one or more policies associated with the service 208. Web servers or other components of the frontend 210 may be configured to operate in accordance with one or more SSL and/or TLS protocols, such as referenced herein. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate. Generally, the authentication service may utilize a cryptographic key that is registered with the authentication service 216 in association with the principal 202.

Upon successful authentication of a request, the authentication service 216 may then obtain policies applicable to the request. A policy may be a set of information that defines a set of permissions with respect to a set of resources. The policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 216 may provide an authentication response and, if applicable (e.g., when there is a positive authentication response), the obtained policies back to the service frontend 210. The authentication response may indicate whether the response was successfully authenticated. The service frontend 210 may then check whether the fulfillment of the request for access to the service 208 would comply with the obtained policies using an authorization module 212.

An authorization module 212 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

In an embodiment, the service backend 214 comprises a plurality of data storage servers 222 that stores data at least some of which may be encrypted using various techniques described herein. Various servers of the service frontend 210 may be configured to receive plaintext data, encrypt the plaintext data using encryption techniques described herein, and transmit the encrypted data to the service backend 214 for persistent storage thereby. In some embodiments, however, servers in the service backend 214 may perform the encryption. To retrieve data (e.g., in response to a request), servers in the service frontend 210 may communicate with servers in the backend 214 to retrieve encrypted data and perform decryption in accordance with techniques described herein. Note, however, that decryption may be performed by servers in the service backend 214 in some embodiments. Communications to retrieve data from the frontend 210 to the backend 214 may specify ranges to retrieve. Techniques for processing requests involving ranges of data are discussed in more detail below.

The service backend 214 may also store resource metadata (resource metadata repository) that contains metadata about the resources managed by the service 208. The metadata may contain information about the resources, which may depend on the specific type(s) of resources managed by the service 208. Metadata may include, for instance, size of data objects, numbers of data objects in logical data containers, lifecycle information, such as creation dates, edit dates, and other dates, and other information that may be relevant to the resources managed by the service 208, such as parameters for encryption that enable proper decryption. In some embodiments, the resource metadata contains access control information (e.g., policies) additional to access control information stored in policies in the policy repository. The service frontend 210 may be configured to, when a request is received from the principal 202, query the service backend 214 for any applicable access control information and use any returned access control information in determining whether and/or how to fulfill a request. As with access control information discussed above (e.g., policies), access control information may contain conditions associated with resources and/or principals that define rules for access of the resources.

Note that, while FIG. 2 shows a particular configuration of a distributed system of a computing resource service provider, other configurations are also considered as being considered within the scope of the present disclosure. For example, authentication and authorization determinations may be made by different components of a distributed system (e.g., the service frontend 210). As another example, applicable request-mapping rules and authorization rules may be stored in the policy repository and part of obtaining applicable policy may include application of the request-mapping rules to determine the proper authentication rules 216.

Figure 3:
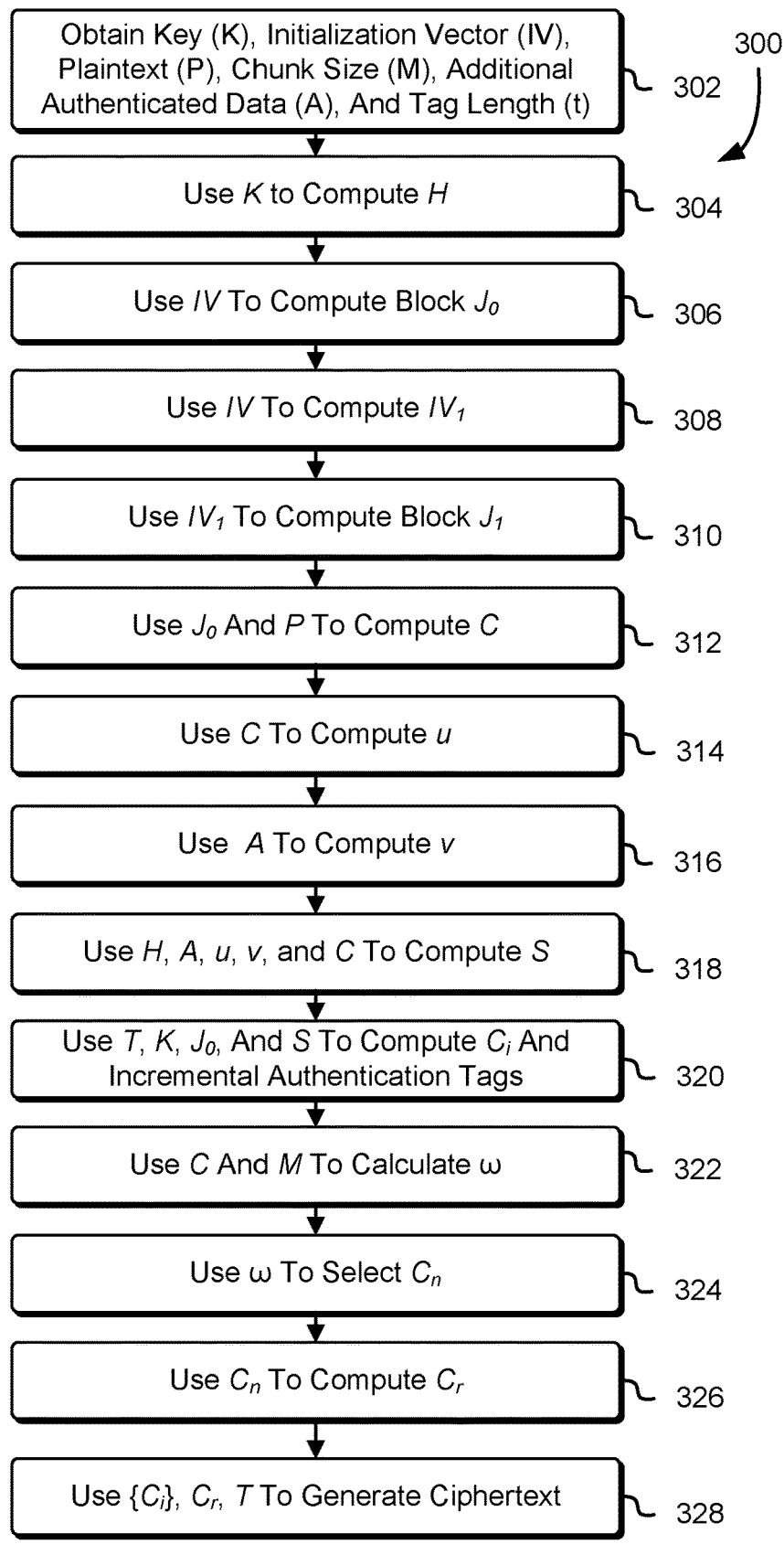
FIG. 3 shows an illustrative example of a process for encrypting data in accordance with an embodiment.

FIG. 3 shows an illustrative example of a process 300 for encrypting data in accordance with an embodiment. The process 300 may be performed by any suitable system, such as by a frontend system described above in connection with FIG. 2 or, generally, any computer system configured with executable instructions to implement the operations described in connection with FIG. 3. In an embodiment, the process 300 is an extension to a process for encrypting data using the Galois/Counter mode of any suitable block cipher such as described in the National Institute of Standards and Technology (NIST) Special Publication 800-38D, which is incorporated herein by reference. The block cipher may be an implementation of the Advanced Encryption Standard, such as described in U.S. Federal Information Processing Standards Publication 197, which is also incorporated herein by reference. Other techniques suitable for using the techniques described herein are described in Request For Comments (RFC) 4106, RFC 4543, RFC 5288, and RFC 6367, also incorporated herein by reference. Note that the techniques described herein may also be implemented in hardware, such as in a cryptographic processor with circuitry configured to perform operations described herein and/or variations thereof.

In an embodiment, the process 300 includes obtaining 302 parameters for performing an encryption. The parameters that are used may vary in accordance with the particular cipher being used and some parameters may be required (e.g., a plaintext) and some may be optional (e.g., additional authenticated data). In an embodiment, the parameters that are obtained 302 include a cryptographic key (K) (also referred to in brief as a "key"), an initialization vector (IV), a plaintext (P), additional authenticated data A, a chunk size (M), and a tag length (t). Some parameters may be received in a request to encrypt the data, such as the plaintext P, the additional authenticated data A (if provided) and, in some embodiments, the cryptographic key K. Some parameters may be obtained by generating or retrieving them as part of processing the request, such as the initialization vector. Some parameters (e.g., the chunk size M (in kilobytes) and the tag length t) may be received in the request or determined as part of processing the request and the source of the parameters may vary in accordance with various embodiments. Further, some parameters, such as the chunk size M and the tag length t may be preconfigured into a system (e.g., either in hardware or in software) performing the process 300.

In an embodiment, encryption in accordance with the process 300 proceeds by computing (304) a value for H, where $H=CIPH_K(0^{128})$. Note that $CIPH_K(X)$ refers to the output of the forward cipher function of the block cipher being used under the cryptographic key K applied to a block X, where $0^{128}$ refers to a bit string of one hundred and twenty eight zero bits and, generally, $0^n$ refers to a bit string of n zero bits.

In an embodiment, the process 300 also includes using 306 the initialization vector IV to compute a block $J_0$. The block $J_0$ may be computed such that:

if len(IV)=96, then let $J_0=IV\|0^{31}\|1$, but if len(IV)≠96, then let $s=128\lceil len(IV)/128\rceil-$len(IV) and then calculate $J_0=GHASH_H(IV\|0^{s+64}\|[len(IV)]_{64})$.

Note that len(IV) refers to the length, in number of bits, of the initialization vector IV. In an embodiment, the initialization vector IV is also used 308 to compute a block $IV_1$ as $IV_1=xor(IV, 1^{len(IV)})$, where xor indicates the exclusive OR operation. Note also that X∥Y represents the concatenation of two bit strings X and Y. This new block, $IV_1$, may be used with the same algorithm above, substituting IV with $IV_1$, to compute 310 a block $J_1$ as follows:

If len($IV_1$)=96, then let $J_1=IV_1\|0^{31}\|1$.

If len($IV_1$)≠96, then let $s=128\lceil len(IV_1/128\rceil-$len($IV_1$), and let $J_1=GHASH_H(IV_1\|0^{s+64}\|[len(IV_1)]_{64})$.

Note that $GHASH_H(X)$, in an embodiment, is the output of the Galois hash (GHASH) function under the hash subkey H applied to a bit string X The GHASH function is described in NIST Special Publication 800-38D.

Having the block $J_0$, a value for C can be computed 312 as $C=GCTR_K(inc_{32}(J_0),P)$.

Note that $GCTR_K(ICB, X)$, in an embodiment, is the output of the Galois counter (GCTR) function, as defined in NIST Special Publication 800-38D, for a block cipher using the cryptographic key K applied to the bit string X, with initial counter block ICB.

In an embodiment, the values of C and A are used to compute 314 u and to compute 316 v as follows:

$u=128\cdot\lceil len(C)/128\rceil-len(C)$ $v=128\cdot\lceil len(A)/128\rceil-len(A)]$.

A block, S, may be computed 318 as follows:

$$S = \text{GHASH}_H(A \| 0^v \| C \| 0^u \| [\text{len}(A)]_{64} \| [\text{len}(C)]_{64})$$

During the computation for S, for every M kilobytes of plaintext that has been encrypted, various values for $C_i$ and authentication tags are calculated 320. Specifically, for i being the multiples of $(2^{10} \cdot M)$ bytes of plaintext that has been encrypted and $C_i$ being the $(2^{10} \cdot M)$ bytes of C that has been generated so far, $$S_i = \text{GHASH}_H(A \| 0^v \| C_i \| [\text{len}(A)]_{64} \| [\text{len}(C_i)]_{64})$$

$$\hat{T}_i = \text{GCTR}_K(\text{inc}_{32}(J_1), S_i)).$$

Note that $\text{inc}_s(X)$ refers to output of incrementing the right-most s bits of the bit string X, regarded as a binary representation of an integer, by one modulo $2^s$. A final authentication tag, T, may be computed as follows:

$$T = \text{MSB}_t(\text{GCTR}_K(J_0, S)).$$

Note that $\text{MSB}_s(X)$ represents the s right-most bits of the bit string X.

The values of C and M can then be used to compute 322 a value for ω as follows:

$$\omega = \left\lfloor \frac{len(C)}{M} \right\rfloor.$$

A final ciphertext chunk may then be computed by first using ω to select 324 a ciphertext chunk $C_n$, but first determining n as follows:

if ω·M=len(C), then let n=MAX(0,ω−1)

if ω∩M≠len(C), then let n=MAX(0,ω).

The final ciphertext chunk, $C_r$, may then be computed 326 as $C_r = C - C_n$.

Note that the symbol "−" in mathematical phrases such as "$C_i - C_j$" refers to string subtraction where the bit string $C_i$ is shortened by removing the sub-bit string $C_j$ from $C_i$. Note also that, as clear from context, the symbol "−" may have other meanings, such as conventional subtraction when the symbol occurs between two integers, such as in the phrase above "ω−1".

Once the final authentication tag T and the final ciphertext chunk $C_r$ have been computed, the initial (i.e., first until next to last) ciphertext chunks $\{C_i\}$ (where $\{C_i\}$ refers to the set of chunks $C_i$ to $C_n$, indexed by i) are used to generate 328 the ciphertext Ĉ from the ciphertext C as:

$$\hat{C} = C_1 \| \hat{T}_1 \| C_2 - C_1 \| \hat{T}_2 \| \ldots \| C_n - C_{n-1} \| \widehat{T_n} \| C_r \| T$$

where $C = C_1 \| C_2 - C_1 \| C_3 - C_2 \ldots \| C_n - C_{n-1} \| C_r$.

Figure 4:
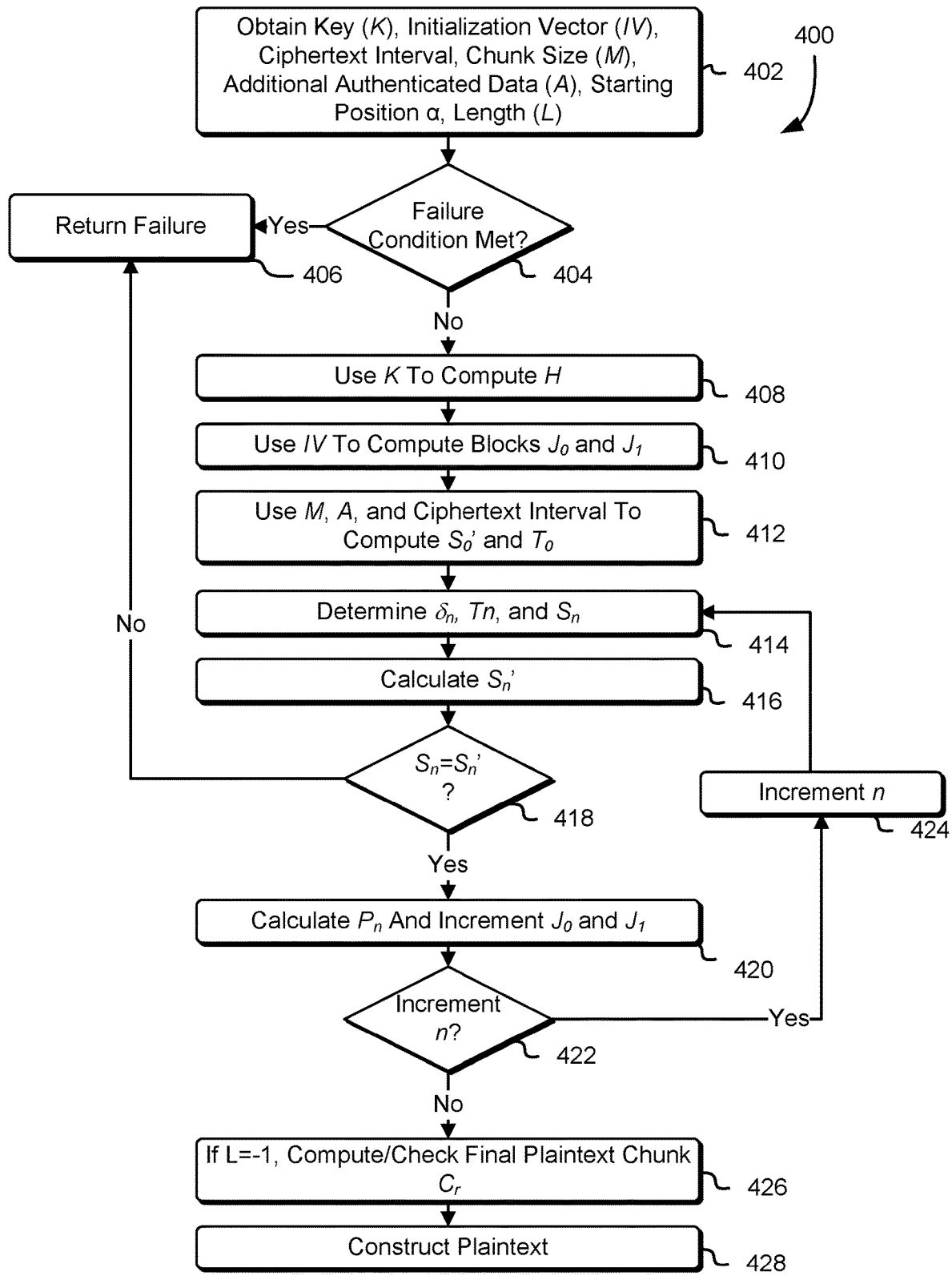
FIG. 4 shows an illustrative example of a process for decrypting data in accordance with an embodiment.

As noted above, ciphertext constructed in accordance with the technique described above in connection with FIG. 3 may be used to persist ciphertext in a form that enables incremental retrieval where portions of the ciphertext can be authenticated and decrypted without requiring the complete ciphertext. FIG. 4 shows an illustrative example of a process 400 for decrypting a portion of ciphertext (which may be all of the ciphertext or less than all of the ciphertext). The process 400 may be performed by any suitable system, such as the system that performs the process 300 discussed above in connection with FIG. 3.

In an embodiment, the process 400 includes obtaining 402 a set of parameters sufficient for decryption of the ciphertext. As with the process 300 discussed above, parameters may be obtained in various ways, such as in a request to decrypt data and as part of fulfillment of a request to decrypt data. In an embodiment, the parameters include initialization vector IV, a chunk size M (in kilobytes) used during authentication encryption (e.g., by performing the process 300 discussed above in connection with FIG. 3), and α, the starting position, in unit of $2^{10}$ M bytes, of the plaintext P which the first or 17th byte of $\widehat{C_a}$ corresponds to. For example, if α=1, the first byte of $\widehat{C_a}$ corresponds to the first byte of P (and therefore the first byte of Ĉ also), but the length of $\widehat{C_a}$ can be less than or equal to that of Ĉ in such case. If α=2, the first byte of $\widehat{C_a}$, which is $\widehat{C_2}$, corresponds to $\hat{T}_1$ whereas the 17th byte of $\widehat{C_a}$ corresponds to the $2^{10}$ M+1st byte of P. Similarly, if α=3, the first byte of $\widehat{C_3}$, corresponds to $\hat{T}_2$ whereas the 17th byte of $\widehat{C_3}$ corresponds to the $2 \cdot 2^{10}$ M+1st byte of P, etc. The parameters may also include L, which represents the number of M-kilobytes of the plaintext to be decrypted from the starting position, α; or −1 if the rest of the plaintext is to be decrypted. In an embodiment, L is set to −1 whenever the rest of the plaintext is to be decrypted.

Another parameter includes $\widehat{C_a}$, representing the ciphertext that begins with an authentication block $(\widehat{T_{\alpha-1}})$ except when α=1, and ends with an authentication block ($\hat{T}_j$) or T. In particular, when α is greater than 1, the 17th byte of $\widehat{C_a}$ corresponds to the $(i \cdot M \cdot 2^{10} + 1)$st byte of the plaintext P. When α=1, the first byte of $\widehat{C_a}$ corresponds to the first byte of P. Note $\widehat{C_a} = \hat{C}$ if and only if α=1 and δ=−1, where Ĉ is the entire output from the extended authenticated encryption algorithm discussed above in connection with FIG. 3. Further, the parameters may include additional authenticated data A, if such was included with the plaintext and input into the encryption algorithm.

Having obtained 402 the parameters sufficient for decryption, the process 400 may include checking 404 whether any failure conditions are met. In an embodiment, the failure conditions include the following:

bit lengths of IV, A or C are not supported;
M is less than 1 or not a multiple of $2^{10}$;
α is less than 1;
L=0, or L<−1;

If $L > 0$ and if $\alpha = 1$ and $\frac{len(\widehat{C_\alpha})}{8} \neq (2^{10}M + 16)L$; and If $L > 0$ and if $\alpha \neq 1$ and $\frac{len(\widehat{C_\alpha})}{8} \neq (2^{10}M + 16)L + 16$.

Note that failure of any one condition may result in determining to return 406 failure, that is, transmit a message that indicates that decryption has failed. Further note that, in some embodiments, failure may be curable, such as by determining one or more alternate values that will result in no failure condition being met and decryption to be successful (e.g., correct).

If it is determined 404 that no failure conditions are met, the process 400 may include proceeding to decrypt the ciphertext interval $\widehat{C_a}$. Decryption of the ciphertext interval, in an embodiment, comprises computing 408 H as $\text{CIPH}_K(0^{128})$. The initialization vector IV may be used to compute 410 $J_0$ and $J_1$. In an embodiment, for $J_0$, if len(IV)=96, then $J_0$ is computed to be $IV \| 0^{31} \| 1$. However, if len(IV)≠96, then s is computed to be $128 \lceil \text{len}(IV)/128 \rceil - \text{len}(IV)$, and $J_0$ is computed as $\text{GHASH}_H(IV\|0^{s+64}\|[\text{len}(IV)]_{64})$. $J_0$ is then incremented by $\alpha \cdot M \cdot 2^6$ times (via $\text{inc}_{32}$).

A system performing the process 400 then defines a block $IV_1$ as $IV_1 = \text{xor}(IV, 1^{\text{len}(IV)})$. The system then defines the block, $J_1$, using the same algorithm as for $J_0$, except substituting IV with $IV_1$. In detail:

if $\text{len}(IV_1)=96$, then $J_1$ is computed as $J_1 = IV_1\|0^{31}\|1$;

however, if $\text{len}(IV_1)\neq 96$, then s is set as $s=128\lceil \text{len}(IV_1)/128 \rceil - \text{len}(IV_1)$, and $J_1$ is computed as $J_1 = \text{GHASH}_H(IV_1\|0^{s+64}\|[\text{len}(IV_1)]_{64})$, incremented $\alpha$ times (via $\text{inc}_{32}$).

In other words, $J_1$ is computed to be the result of $\text{inc}_{32}(\text{GHASH}_H(IV_1\|0^{s+64}\|[\text{len}(IV_1)]_{64}))$ performed $\alpha$ times.

Once $J_0$ and $J_1$ have been computed, in an embodiment, the system performing the process 400 computes $S_0'$ and $T_0$ by first computing an offset as follows:

$$l = M \cdot 2^{10};$$

if $\alpha=1$, set offset=0;

if $\alpha \neq 1$, set offset=16.

The system then sets $i = \text{offset}+1$ and determines whether L is equal to $-1$. If $L=-1$, the system computes a value $B_c$ as follows:

$$\text{if } \text{len}(\widehat{C_r})/8 - (\max \cdot (l+16) + \text{offset}) \neq \frac{t}{8}, \text{ then}$$

$$\max = \left\lfloor \frac{\text{len}(\widehat{C_r})8 - \text{offset} - t/8}{l+16} \right\rfloor, \text{ unless}$$

$$\text{but if } \text{len}(\widehat{C_r})/8 - (\max \cdot (l+16) + \text{offset}) = \frac{t}{8}, \text{ then}$$

$$\max = \left\lfloor \frac{\text{len}(\widehat{C_r})8 - \text{offset} - t/8}{l+16} \right\rfloor - 1.$$

$B_c$ is then calculated as $B_c = \text{len}(\widehat{C_a}) - \max \cdot 128 - \text{offset} \cdot 8 - t$. If, however, L is not equal to $-1$, the system performing the process 400 computes as follows:

$$\max = \left\lfloor \frac{\text{len}(\widehat{C_n})/8 - \text{offset}}{l+16} \right\rfloor;$$

$$B_c = \text{len}(\widehat{C_a}) - \max \cdot 128 - \text{offset} \cdot 8.$$

The system, in an embodiment, then computes $$u = 128 \cdot \lceil B_c/128 \rceil - B_c,$$

$$v = 128 \cdot \lceil \text{len}(A)/128 \rceil - \text{len}(A).$$

Having computed u and v, the system performing the process 400 may then compute $S_0'$ and $T_0$. If $\alpha=1$, then:

$$S_0' = \text{GHASH}_H(A\|0^v).$$

However, if $\alpha \neq 1$, then $$T_0 = \widehat{C_a}[1:16]$$

$$S_0' = \text{GCTR}_K(\text{inc}_{32}(J_1), T_0)$$

Note that the notation X[a:b] refers to a range of a byte string that is X, where the range includes and begins with the $a^{th}$ byte of X and includes and ends with the $b^{th}$ byte of X, where a and b are positive integers.

After computing $S_0'$ and $T_0$, in an embodiment, the system increments $J_1$ by 1.

Having computed $S_0'$ and $T_0$, in an embodiment, the process 400 includes, starting with $n=1$, calculating 414 a value for $S_n$ as follows:

$$\delta_n = \widehat{C_a}[i:l];$$

$$T_n = \widehat{C_a}[i+l:16];$$

$$S_n = \text{GCTR}_K(\text{inc}_{32}(J_1), T_n).$$

To incrementally authenticate chunks of ciphertext, the system performing the process 400 computes 416 a reference value $S_n'$:

$$S_n' = \text{iGHASH}(\delta_n\|[\text{len}(A)]_{64}\|[\text{len}(l(\alpha+n))\cdot 8]_{64}, S_{n-1}').$$

The process 400 then includes determining 418 whether the reference value $S_n'$ matches $S_n$. If the two values do not match, in an embodiment, the process includes returning failure, such as described above. If, however, the system performing the process 400 determines 418 that the values do match, the system calculates $P_n$ and increments i, $J_0$ and $J_1$ as follows:

$$P_n = \text{GCTR}_K(\text{inc}_{32}(J_0), (\delta_n);$$

$J_1$ is incremented by 1; and $J_0$ is then incremented by $2^6 M$;

$i$ is set to $i = i+l+16$.

Having calculated $P_n$ and incremented the above values, the system performing the process 400 determines 422 whether to increment n (by one). In an embodiment, if n is less than max (calculated above), the process 400 includes determining 422 to increment n and increments (424) n by one, accordingly. The above calculation of $P_n$ and increments may repeat, as discussed above, until determined 422 to not increment n (e.g., in an embodiment, because n is equal to max).

When determined 422 to not increment n, in an embodiment, the system performing the process 400 computes and checks 426 the authenticity of the final ciphertext chunk corresponding to the plaintext to be determined by performance of the process 400. To do this, in an embodiment, the system first determines whether $L=-1$ and, if it does, the system proceeds to compute:

$$l_r = \text{len}(\widehat{C_a})/8 - (\max(l+16) + \text{offset});$$

$$C_r = \widehat{C_a}[i:l_r-t/8];$$

$$T = \widehat{C_a}[i+l_r-t/8:t/8];$$

$$S = \text{iGHASH}_H(C_r\|0^u\|[\text{len}(A)]_{64}\|[B_c+8\cdot l\cdot \alpha]_{64}, S_{max}');$$

$$P_r = \text{GCTR}_K(\text{inc}_{32}(J_0), C_r);$$

$$T' = \text{MSB}_t(\text{GCTR}_K(J_0, S)).$$

Note that [x]s represents the binary representation of the non-negative integer x as a string of s bits, where x is less than $2^s$. In an embodiment, the function $\text{iGHASH}_H(X, Y)$ represents an incremental hash function, an example of which is described in more detail below in connection with FIG. 5.

The value of T' is used for authentication and, in an embodiment, if $T\neq T'$, then the process 400 includes returning 406 failure, such as described above. If, however, $T\neq T'$, then, in an embodiment, the process 400 includes constructing 428 the partial plaintext as:

$$P_{(\alpha,L)} = P_\alpha\|P_{\alpha+1}\|\ldots\|P_{max}\|P_r.$$

Figure 5:
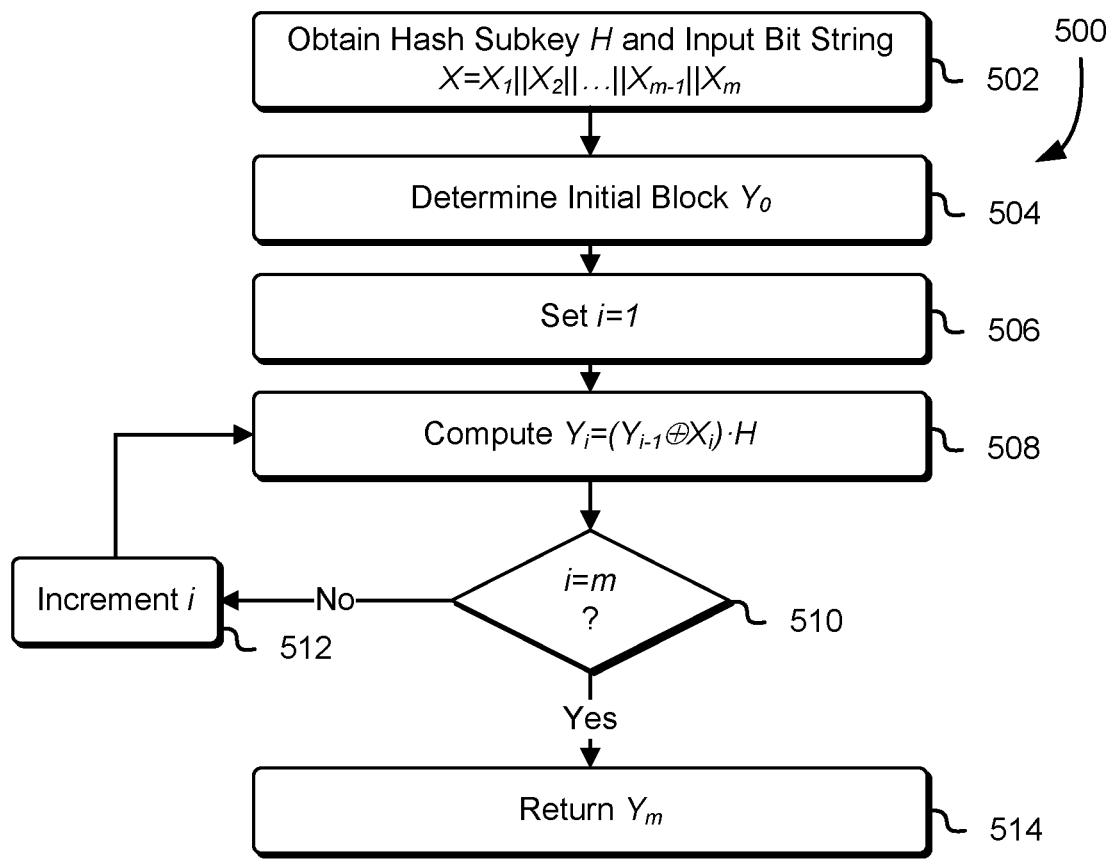
FIG. 5 shows an illustrative example of a process for computing a hash in accordance with an embodiment.

As noted above, various techniques of the present disclosure may be performed using an incremental hash function. FIG. 5 shows an illustrative example of a process x for implementing such an incremental hash function, referred to as iGHASH$_H$(X, Y), in accordance with an embodiment. The process 500 may be performed by any suitable system, such as a system configured to perform the process 300 and/or the process 400 and/or variations thereof. In an embodiment, the process 500 includes obtaining 502 a hash subkey H (where H may be as described above) an input bit string X The bit string X, may be constrained such that len(X)=128 m for some positive integer m. The bit string X may also be may be represented as $X_1, X_2, \ldots, X_{m-1}, X_m$, the unique sequence of blocks such that $$X = X_1 \| X_2 \| \ldots \| X_{m-1} \| X_m.$$

Different from typical implementations of the GHASH function, in the process 500, in an embodiment, the system performing the process determines 504 the initial block $Y_0$ as the second input of the iGHASH$_H$(X, Y) function.

With the inputs obtained 502, 504, in an embodiment, the process 500 includes setting 506 an index, i, to 1. A value of $Y_i$ may be computed as:

$$Y_i = (Y_{i-1} \oplus X_i) \cdot H.$$

Note that, for two bit strings X and Y of the same length, the symbol $\oplus$ in $X \oplus Y$ represents the bitwise exclusive-OR of X and Y. Note also that • in X•Y represents the product of two blocks, X and Y, where X and Y are regarded as elements of a binary Galois field, such as the binary Galois field defined by the polynomial $f=1+\alpha+\alpha^2+\alpha^7+\alpha^{128}$, although other binary Galois fields, such as binary Galois fields defined over other irreducible polynomials may be used.

A determination may be made 510 whether i is equal to m and, if i is not equal to m, the process 500 may include incrementing i by one and computing $Y_i$ again, as discussed above. Incrementing i and computing $Y_i$ may repeat as illustrated in FIG. 5 until it is determined 510 that i is equal to m. As a result of determining 510 that i is equal to m, the process 500 may include returning $Y_m$ as the value if iGHASH$_H$(X, Y).

Figure 6:
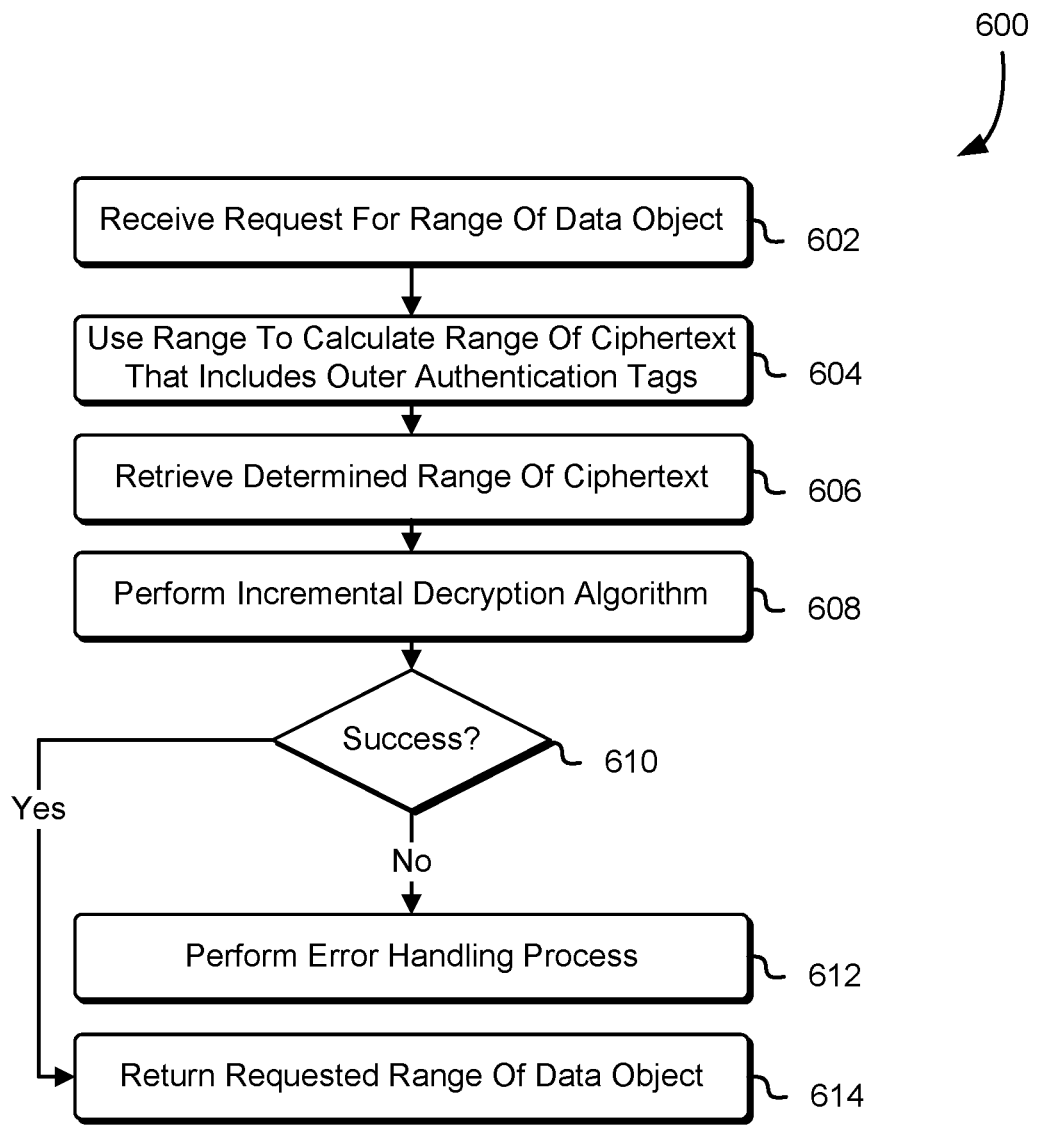
FIG. 6 shows an illustrative example of a process for processing a request to retrieve data that is persisted in encrypted form in accordance with an embodiment.

As noted above, the techniques described herein allow for numerous efficiencies in computer systems that utilize encrypted data. For example, in many instances, only a portion of a data file may be needed. Utilizing the techniques described above, such a data file may be encrypted and stored, but may be accessed incrementally while still maintaining the ability to check authenticity of the data that is accessed. FIG. 6 shows an illustrative example of a process 600 for handling a request to access data in accordance with an embodiment. The process 600 may be performed by any suitable system, such as a server of a service, which may be a data storage service or, generally, any system that has access to stored data and that is configured to generate responses to requests that involve the stored data.

In an embodiment, the process 600, accordingly, includes receiving a request for a range of a data object, where an identifier for the data object may be specified in the request. The request may be received 602 over a network, such as described below. The range may be specified in a parameter of the request, such as a hyptertext transfer protocol (HTTP) range header and, as such, may specify the first and last bytes in the range. Note that the range may be specified in other ways, such as by specifying a starting byte and a length of a range. In some examples, the range corresponds to a proper subsequence of bits that form the data object. In some examples, the range is specified in terms of the plaintext while, in other embodiments, the range may be specified in terms of the ciphertext which, as noted above, may be larger than the plaintext due to authentication tags and, as a result, may be different from a corresponding range specified in terms of the plaintext.

To retrieve the requested range of the data object, in an embodiment, the process 600 includes using 604 the range to calculate a range of ciphertext that corresponds to the specified range and that includes outer authentication tags, that is, authentication tags sufficient for authenticating ciphertext that, when decrypted, results in data in the specified range. Using the structure of the ciphertext illustrated in FIG. 1, for example, the outer authentication tags may be authentication tags between which ciphertext chunks completely encode the plaintext of the specified range. Note that, in various embodiments, an authentication tag is considered to be sufficient for authenticating a set of chunks of ciphertext if it serves as an indicator of authenticity of the set of chunks of ciphertext. Such an authentication tag may not be completely sufficient in the sense that other information, such as correct inputs into a cipher (e.g., a cryptographic key, an initialization vector, and, in some instances, additional authenticated data) may be required to authenticate the set of ciphertext chunks using the authentication tag. In other words, an authentication tag may be sufficient for authentication despite additional information needed to actually perform the authentication. In some embodiments, the outer authentication tags are the closest such authentication tags, although the process 600 can be performed to use authentication tags that are further apart.

In many instances, the specified range may not exactly match the outer boundaries the first and last ciphertext chunks that encode the plaintext. For example, an endpoint of the specified range may correspond to a bit in the middle of a ciphertext chunk. As a result, calculating 606 the range may include applying a formula to translate the specified range to a range of ciphertext. In some examples, the formula begins with a linear transformation that is then used to determine which ciphertext chunks to include in the range. For example, a left endpoint of the range of plaintext can be transformed to a byte value for the ciphertext. The byte value of the ciphertexts may then be mapped to the closest left endpoint of an authentication tag in the ciphertext that is at or before the byte value. (Note, however, that if the byte value falls in the first ciphertext chunk, the mapping may be to the left endpoint of the first ciphertext chunk.) Similarly, a right endpoint of the range of plaintext may be mapped to a byte value of the ciphertext. This byte value may be mapped to the closest right endpoint of an authentication tag that is at or greater than the byte value. As noted, further blocks to the left and right may also be selected in some embodiments. Generally, a range of plaintext specified in the request may be mapped to a range of ciphertext that is sufficient for authenticating chunks of ciphertext within the range of ciphertext and obtaining, from those chunks of ciphertext, the range of plaintext.

Note also that the manner in which the range of plaintext is mapped to a range of ciphertext may vary in accordance with various parameters used to generate the ciphertext. For instance, in some embodiments, some parameters (e.g., chunk size and/or authentication tag size) may be configurable such that different data objects are stored in encrypted form where the parameters vary among the data objects. The parameters may be stored in metadata of the data objects and/or in the ciphertext itself (in plaintext form). When a mapping of a range of plaintext to a range of ciphertext is performed, the mapping may depend on the parameters that were used to generate the ciphertext. Such parameters may be accessed and used to determine the specific mapping to be applied. In some embodiments, however, a system is configured to use a consistent set of parameters and, as a result, may use consistent mapping.

Once the range of ciphertext has been calculated 604, the process 600 may include retrieving 606 the determined range of ciphertext. The range may be accessed from data storage and, in some examples, involves submitting another request (e.g., to a data storage server) that specifies the range of ciphertext. Once the range of ciphertext 606 has been retrieved 606 (or, in some embodiments, as the range of ciphertext is being retrieved), the process 600 includes performing 608 an incremental decryption algorithm 608, such as described above in connection with FIG. 5.

In various embodiments, performance 608 of the incremental decryption algorithm result in one of two possible outputs: success or failure, where success requires all calculated plaintext as well as any applicable additional authenticated data to be successfully authenticated. Accordingly, in an embodiment, the process 600 comprises determining 610 an outcome of performance 608 of the incremental decryption algorithm. If the system performing the process 600 determines that performance 608 of the incremental decryption algorithm was unsuccessful, the system may perform 612 an error handling process. The error handling process may vary in accordance with various embodiments. For example, the error handling process may include transmitting a message in response to the request that was received 602 that indicates a failure. In other embodiments, one or more attempts to retrieve the data in another way, such as from another copy of the ciphertext or by reconstructing the ciphertext using a redundancy encoding scheme (e.g., an erasure coding scheme) and reattempting the decryption. Further, because of the way in which the authentication tags are constructed and arranged, an error handling process may include identifying which ciphertext chunk(s) have corresponding plaintext that is unable to be authenticated and, if applicable, providing at least plaintext data that is able to be authenticated. In some examples, plaintext is provided regardless of whether successfully authenticated and one or more error messages may indicate which portion(s) of the plaintext were unsuccessfully authenticated.

If, however, it is determined 610 that performance 608 of the incremental decryption algorithm was successful, in an embodiment, the process 600 includes returning 614 the requested range of the data object that was requested. Note that additional operations may be performed to return the requested 614 range. For instance, an endpoint of the range of plaintext may correspond to an internal portion of a ciphertext chunk and, as a result, more plaintext than requested may be obtained as a result of performance 608 of the incremental decryption algorithm. Bits may be discarded so that the result that is returned 614 in response to the request that was received 602 may be discarded so that the response matches the requested range exactly.

Other variations are also considered as being within the scope of the present disclosure. For example, the above techniques use specific numbers for the purpose of illustrating techniques in a specific example. However, the techniques can be adapted to use different numbers, such as ciphers using different key sizes and other different parameters. While the techniques work particularly well with AES-GCM, the techniques can be adapted to other block ciphers. Further, while certain mathematical operations are used for the purpose of illustration, other operations can replace those specifically mentioned herein, such as other mathematical operations that have the same, similar or, generally, suitable properties and the scope of the present disclosure is not limited to those specific operations mentioned herein.

Figure 7:
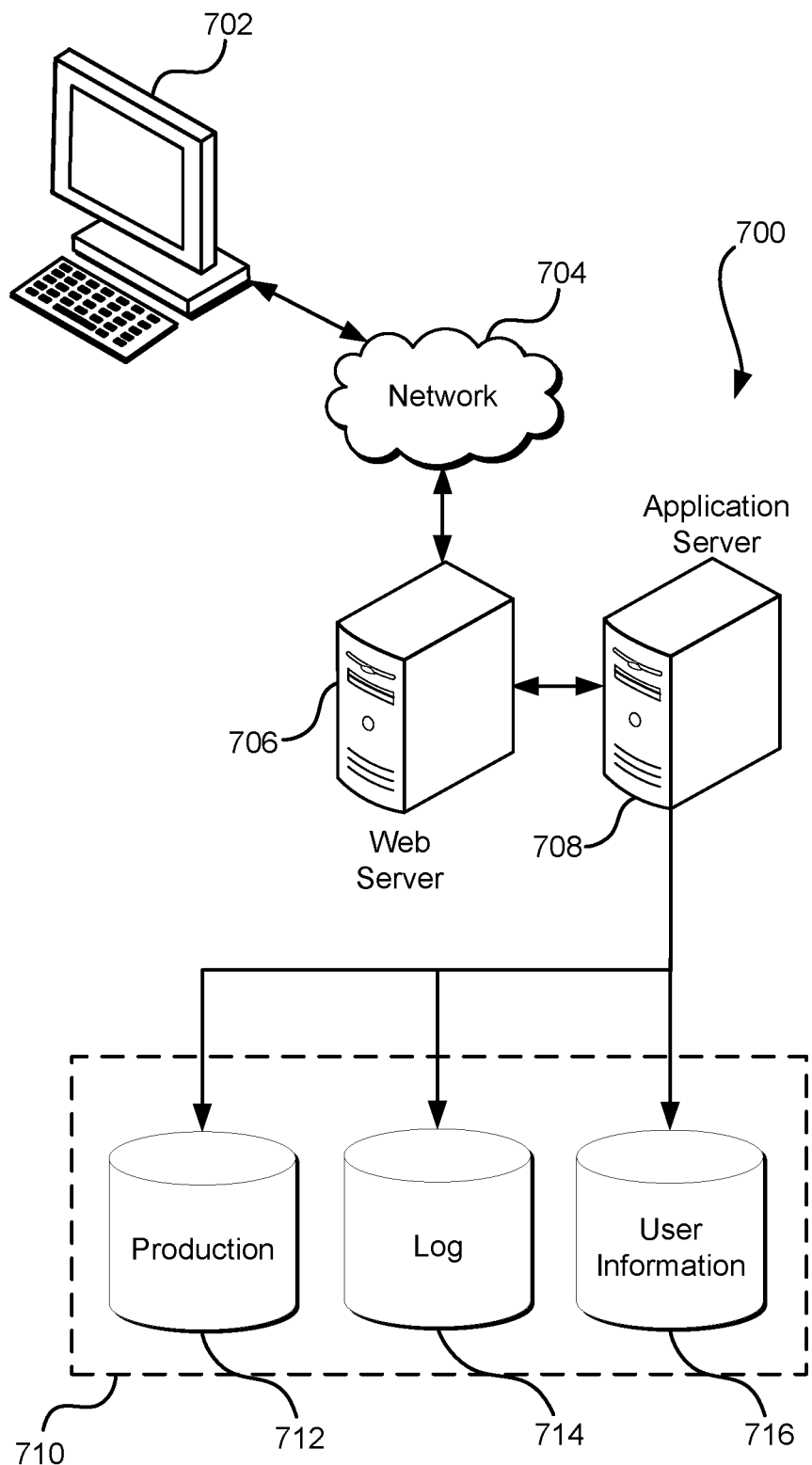
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a plaintext;
   computing, based at least in part on the plaintext, a first ciphertext comprising an ordered set of bit strings;
   computing, using an incremental hash function that computes elements of a binary Galois field based at least in part on a previous invocation of the hash function, a sequence of authentication tags including:
      a first authentication tag positioned before a subset of the ordered set of bit strings and a second authentication tag positioned after the subset, where the first authentication tag is calculated based at least in part on the previous invocation of the hash function and an output of incrementing a number of the right-most bits of the subset of the ordered set of bit strings;
   constructing a second ciphertext that includes the subset of the ordered set of bit strings of the first ciphertext positioned after the first authentication tag and before the second authentication tag;
   providing the second ciphertext;
   obtaining a request to access a subsequence of the plaintext, the request including information specifying a first byte and a last byte of the subsequence within the plaintext, where the subsequence of the plaintext is within the second ciphertext between the first authentication tag and the second authentication tag including an intermediary authentication tag between the first authentication tag and the second authentication tag; and
   fulfilling the request by at least:
      obtaining the subsequence within the second ciphertext based at least in part on the first byte and the last byte of the subsequence, being between the first authentication tag and the second authentication tag;
      decrypting the subsequence of the second ciphertext to obtain a partial plaintext by at least decrypting ciphertext between the first authentication tag and the intermediary authentication tag and ciphertext between the intermediary authentication tag and the second authentication tag;
      removing a first set of bits of the partial plaintext between the first authentication tag and the first byte and a second set of bits of the partial plaintext between the last byte and the second authentication tag; and
      authenticating the subsequence within the second ciphertext based at least in part on the first authentication tag, the intermediary authentication tag, and the second authentication tag
      authenticating the second ciphertext at least in part on the first authentication tag and the second authentication tag further comprises using the first authentication tag and the second authentication tag of the second ciphertext, without using any authentication tags from outside a proper subset of the second ciphertext, to authenticate a set of chunks of ciphertext within the proper subset of the second ciphertext prior to decrypting the proper subset of the second ciphertext.

2. A system, comprising:
   one or more hardware processors; and
   a non-transitory computer-readable storage medium that stores instructions that, as a result of being executed by the one or more hardware processors, cause the system to:
      obtain, at a computing device, a first ciphertext of plaintext;
      generate, at the computing device, based at least on the first ciphertext of the plaintext, using an incremental hash function that computes elements of a binary Galois field based at least in part on a previous invocation of the hash function, a second ciphertext that comprises a plurality of authentication tags and a plurality of ciphertext chunks of the first ciphertext, the ciphertext chunks:
         being interleaved with the plurality of authentication tags; and
         the plurality of authentication tags including a first authentication tag and a second authentication tag that bounds a subset of ciphertext chunks of the plurality of ciphertext chunks, and an intermediary authentication tag between the first authentication tag and the second authentication tag, where the first authentication tag is positioned preceding the subset of ciphertext chunks and the second authentication tag is positioned after the subset of ciphertext chunks and the first authentication tag is determined based at least in part on the previous invocation of the hash function and an output of incrementing a number of the right-most bits of a ciphertext chunk of the subset of ciphertext chunks;
      provide, from the computing device, the second ciphertext;
      obtain a request to access a subsequence of plaintext of the plaintext, the subsequence of plaintext specifying a first byte and last byte of the subsequence of plaintext within the plaintext, where the subsequence of plaintext includes the intermediary authentication tag;

translate the subsequence of plaintext into the subset of ciphertext chunks bounded by the first authentication tag and the second authentication tag;

decrypt a first ciphertext chunk of the subset of ciphertext chunks between the first authentication tag and the intermediary authentication tag and a second ciphertext chunk of the subset of ciphertext chunks between the intermediary authentication tag and the second authentication tag; and authenticate the first ciphertext chunk and the second ciphertext chunk based at least in part on the first authentication tag, the intermediary authentication tag, and the second authentication tag receive a second request to retrieve a second range of the plaintext;

decrypt a portion of ciphertext that is less than all the ciphertext to obtain the second range of the plaintext;

authenticate the portion of the ciphertext without using at least one authentication tag of the plurality of authentication tags; and provide the second range of the plaintext in response to the second request.

\* \* \* \* \*